Aug. 8, 1944. L. E. HANKISON 2,355,373
APPARATUS FOR FILTERING AND DEHYDRATING FLUIDS
Filed March 3, 1942 2 Sheets-Sheet 1
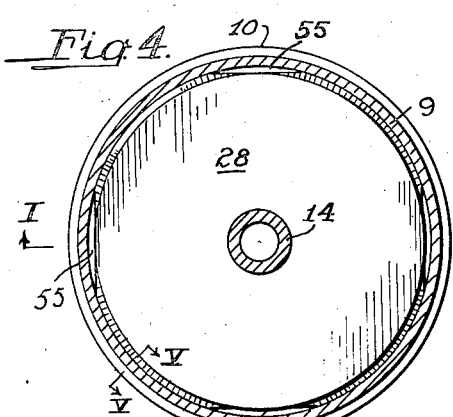
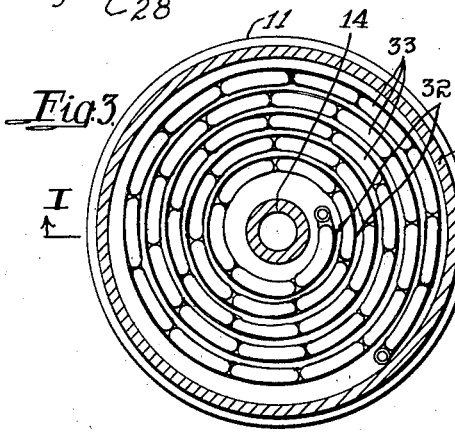
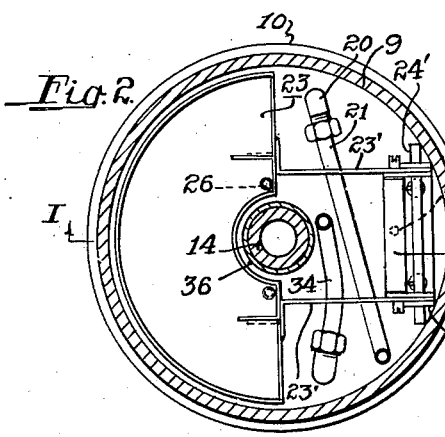
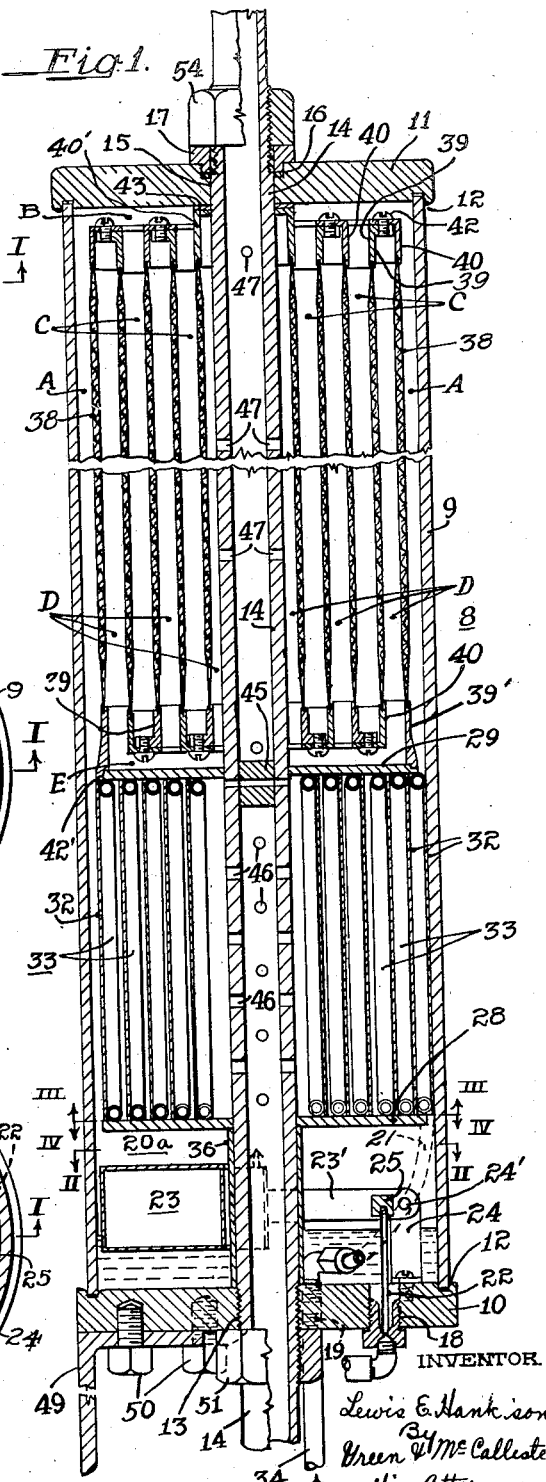
INVENTOR.
Lewis E. Hankison
By Green & McCallester
His Attorneys Aug. 8, 1944.  L. E. HANKISON  2,355,373
APPARATUS FOR FILTERING AND DEHYDRATING FLUIDS
Filed March 3, 1942  2 Sheets-Sheet 2
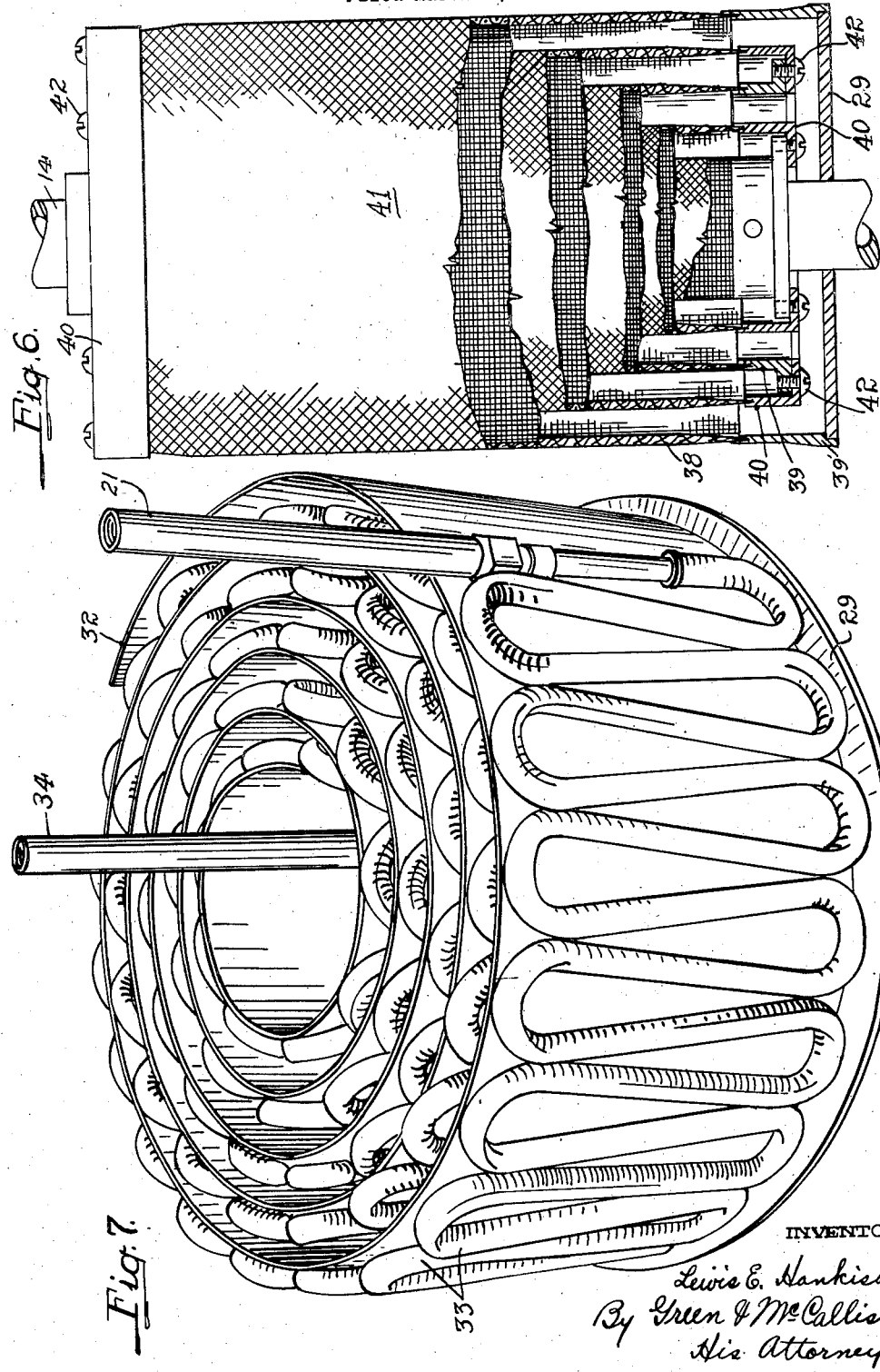

Patented Aug. 8, 1944

2,355,373

UNITED STATES PATENT OFFICE 2,355,373

APPARATUS FOR FILTERING AND DEHYDRATING FLUIDS

Lewis E. Hankison, Dormont, Pa.

Application March 3, 1942, Serial No. 433,108

3 Claims. (Cl. 183—32)

This invention relates to apparatus for treating air as a preliminary to its use as the motivating fluid in apparatus, such as indicating, recording and control mechanisms or devices, which are so constructed that solid, or other contaminating material within the motivating fluid may detrimentally affect their operation or even render them inoperative.

It is present practice to filter air and to subject it to some dehydrating procedure before employing it as the motivating fluid in recording, indicating, control and similar mechanisms which are designed to respond to slight changes in pressure, temperature, etc., and an object of the present invention is to produce an effective and efficient apparatus for dehydrating and filtering air or similar fluids, which is compact and so arranged that it may be readily installed as a source of motivating fluid supply or as a part of a unit which constitutes such a source.

A further object is to produce a new and improved procedure for treating air or a similar fluid prior to using it as the motivating fluid in such mechanisms as indicating and recording devices and control apparatus.

A further object is to provide an air filter which is of rugged but simple construction and which is readily and easily assembled and disassembled for operation and maintenance purposes.

A further object is the production of a simple, effective and compact dehydrating and filtering apparatus for air and similar fluids.

These and other objects are attained by means of apparatus illustrated in the drawings accompanying and forming a part hereof.

In the drawings,

Figure 1 is a longitudinal section of a combined dehydrating and filtering apparatus constituting an embodiment of my invention and the section is taken along the plane indicated by the lines I—I of each of Figures 2, 3 and 4.

Figure 2 is a transverse, sectional view of the apparatus shown in Figure 1, the section being taken along the line II—II of Figure 1.

Figure 3 is a transverse, sectional view of the apparatus of Figures 1 and 2 and the section is taken along the line III—III of Figure 1.

Figure 4 is a transverse, sectional view taken at the same plane of Figure 3 but looking in the direction of the arrows IV—IV of Figure 1.

Figure 5 is a fragmental view taken along the line V—V of Figure 4.

Figure 6 is a view, partially in elevation and partially in section, of the assembled filter unit forming a part of the illustrated embodiment of my invention.

Figure 7 is an inverted perspective view of the cooling element employed in the cooling chamber of the apparatus illustrated as embodying my invention.

The invention involves an improved procedure for removing foreign material such as moisture, condensible vapors, dust and other foreign matter, from fluids such as air, and comprises subjecting the fluid to be treated to the cooling, condensing and moisture-collecting action of cooling surfaces while it is caused to move in a circuitous path over and in contact with such surfaces and under conditions such that centrifugal action contributes to and augments the extraction of moisture and such vapors as are condensed by the cooling action. In its narrower aspect, the invention also involves a procedure such as above, in which the collected moisture and condensed vapors contribute to a washing action of the fluid substantially throughout its entire travel within the cooling chamber of the apparatus.

The invention also involves compact apparatus wherein atmospheric or compressed air or a similar fluid is cooled substantially below the dew-point by causing it to move in a circuitous path over and in contact with cooling surfaces so arranged in the path of fluid flow that water and other condensible vapors carried by it are substantially entirely condensed and the resulting condensate moves under the influence of gravity across the cooling surfaces and out of the path of air flow where it is collected as a preliminary to discharging it from the apparatus.

The invention also contemplates such functional and structural features as subjecting the air or fluid to a filtering action while it is maintained well below the dew-point; the use of substantially cylindrical filtering units, interfitted in concentric relationship to form, in effect, a single filter of high capacity; and the assembling of cooling elements, filtering units, and water discharge apparatus, such that all parts are readily accessible for inspection and repair and the assemblage is simple, compact and rugged.

As illustrated, the apparatus includes a casing 8 made up of a cylindrical body 9 and heads 10 and 11. The casing is of simple construction and the cylindrical body 9 thereof may be a section of pipe of adequate internal diameter such, for example, as a section of 8" pipe. Each of the heads 10 and 11 may be in the form of circular plates and, as shown, each is provided with a circular groove 12 which receives one edge of the cylindrical body 9 and thereby centers the head with relation to the body. A suitable gasket is located within each groove 12 and between the head and the body in order to insure an airtight joint. As shown, each head is provided with a central aperture or port and, in Figure 1, the central aperture of the head 10 is indicated by the reference numeral 13, constitutes, in effect, the air inlet port of the apparatus, and is screw-threaded to receive the threaded end of a pipe 14 which constitutes the air inlet.

The central aperture 15 of the head 11 is, in effect, the air outlet port of the apparatus, is axially aligned with the aperture 13 and the pipe 14 is adapted to pass therethrough and to form a tie member between the two heads and also to function as a fluid inlet and a fluid outlet passage. As shown, the aperture 15 is countersunk on the external face of the head 11 for the purpose of receiving a gasket 16 and an extension of a lip washer 17 which is slipped onto the pipe 14 and with that pipe and the nut 54 constitutes the locking means for securing both of the heads 10 and 11 in place on the cylindrical body 9.

The head 10 is provided with a water discharge port 18 and two additional apertures, one of which, viz., the aperture 19, is illustrated in Figure 1 and constitutes the outlet port of the cooling system constituting a part of the apparatus illustrated. The position of the other aperture is indicated in Figure 2 by the reference numeral 20 and is connected to the inlet piping 21 of the cooling system.

The arrangement is such that the portion of the interior of the casing immediately adjacent the head 10 constitutes a water-collecting chamber 20a in which the condensate is collected and from which it is discharged through the port 18. As illustrated, the port 18 is controlled by a needle valve, the movable member or needle 22 of which is actuated by a float 23 which is illustrated in Figures 1 and 2 as a more or less segment-shaped receptacle having arms 23' which constitute a two-part mounting lever for the float. The arms 23' are fulcrumed on a pin 24' carried by a bracket 24 which is secured to the head 10. A cross-bar 25 spans the space between the float-supporting arms 23', is soldered or otherwise secured to said arms and constitutes the operative connection between the float and the needle valve 22. While the float receptacle 23 is enclosed, it is not necessarily hermetically sealed and, as illustrated, is provided with a port 26 which places its interior in open communication with the interior of the casing 8 and which is shown shielded for the purpose of preventing water from entering the interior of the float receptacle.

In the illustrated embodiment, the interior of the casing 8 is, in effect, divided into three chambers or compartments, viz., the water-collecting chamber 20a, a cooling chamber and a filter chamber. The cooling chamber is located immediately above the water-collecting chamber and, as illustrated, the three chambers are in open communication with each other along the interior surface of the cylindrical body portion 9, but are separated fror each other by baffles so arranged, with relation to the air admission and delivery ports, that air entering the casing must first move through the cooling chamber before passing to the filtering chamber and must then move through a filter element before leaving the casing.

In the illustrated embodiment, the baffles 28 and 29, which respectively separate the cooling chamber from the water-collecting chamber and from the filtering chamber, are included in the make-up of the cooling unit, although this is not an essential feature of the invention. Each of these baffles is circular, extends transversely across the interior of the casing 8 and is provided with a central circular aperture which receives and which snugly fits the central pipe or tube 14. Baffle 29 is of less diameter than the internal diameter of the shell 9. The edge of the baffle 28 is shown bevelled in Figures 4 and 5, and cut away portions accommodate the delivery of condensate from the cooling chamber to the collecting chamber 20a. Likewise, the over-all diameter of the plate 29 is such, with relation to the internal diameter of the body 9, as to accommodate an unhampered flow of air from the cooling chamber into the filter chamber which is located immediately above the cooling chamber, i. e., immediately above the baffle 29.

The cooling unit of the apparatus is illustrated in Figures 1, 3 and 7. Figure 7 is a perspective view of the cooling unit in an inverted position and with the baffle plate 28 omitted or removed. The characterizing feature of the cooling unit illustrated is that the cooling element is so arranged in a spiral passage as to provide a circuitous path for the fluid to be cooled and the spiral passage is so located with relation to the apparatus that the air to be cooled enters the inner end of the spiral passages and is caused to move outwardly of the spiral as it moves over and in contact with the cooling element.

As shown in Figure 7, the baffle 29 forms a support for a spiral partition 32 which extends across the baffle 29 and consequently across the baffle 28 and which, with those baffles, provides a spiral passage within the casing 8. This spiral passage constitutes the fluid passage of the cooling chamber. Its inner end surrounds the pipe 14 and its outer end merges with the annular passage defined by the clearance space between the peripheral edges of the baffles 28 and 29 and the inner face of the cylindrical body 9.

A cooling element is located within and extends substantially throughout the entire length of the spiral passage defined by the partition 32. As shown, it consists of piping 33 so arranged within the spiral passage that the water passing therethrough moves in a counter-current direction with relation to the air or fluid flow through the passage. The inlet connection 21 to this piping extends upwardly through the aperture formed in the head 10 at the point 20, through the water-collecting chamber 20a and past the baffle 28 and is fitted to the piping 33 in a suitable manner. The outlet pipe 34 is suitably fitted to the pipe 33, passes through a suitable aperture formed in the baffle 28, extends through the chamber 20a and passes through the suitable aperture 19 in the head 10.

While the cooling pipe 33 is arranged in a spiral, it is also bent into convolutions so that it has the form of a fretwork which extends along the spiral passage and approximately clear across that passage. Each convolution constitutes, in effect, half of a hair-pin loop and the contiguous curves, constituting the loops at each end of the fretwork, are closely adjacent to each other so that the spiral passage is crossed and recrossed by the convolutions of the cooling pipe and under conditions such that the straight portions of each hair-pin loop lie obliquely across the face of the partition 32 at a slight angle to the vertical. The cooling pipe 33 is preferably formed of metal having a high heat-conducting characteristic, such as copper, and its diameter is such that while the cooling fretwork occasions a somewhat turbulent flow of the fluid traversing the spiral passage, nevertheless the unobstructed portion of the passage is adequate for the desired rate of fluid flow through it.

The spiral partition 32 is preferably soldered or otherwise permanently secured to at least one of the baffles 28 or 29. The cooling fretwork, formed of the pipe 33, may also be secured to the baffle 29 so that the assembly of elements constitutes a unit which can be readily and easily handled.

As shown in Figure 1, the pipe 14 is threaded, is screwed into and extends through the central aperture 13 of the head 10 and is secured to the head. A sleeve 36 surrounds the pipe 14, rests on the head 10, and forms a spacer between the head 10 and the baffle 28. It, therefore, forms a support for the baffle 28. As previously described, the pipe 14 passes through the central apertures of each of the baffles 28 and 29 and consequently it centers the cooling assembly within the casing 8 and, by cooperating with the sleeve 36, holds that assembly in a fixed position within the casing.

The filter unit is made up of a plurality of tubular sections or columns 38. Each such column consists of an intermediate open-work portion to which end rings 39 and 40 are rigidly and permanently secured. The intermediate portion may be and preferably is made up of expanded metal and all parts of the filter—as well as all parts of the cooling assembly—are composed of non-corrosive material.

The sections 38 are of different diameter and so arranged that they may be located in interfitted or telescopic relationship and secured together in such a way that the fretwork portions of all the sections combine to provide a fretwork of wide extent through which the air traversing the filtering chamber passes but once in its travel from the cooling chamber to the air outlet of the casing 8. As shown in Figure 1, each of the end rings 39 and 40 of each section 38 interfits with an end ring of an adjacent section and the interfitting rings cooperate to secure the sections together. The rings are so arranged that the concentric passages or spaces between the sections are divided into two groups, i. e., those which are open at the top and those which are open at the bottom.

As shown in Figures 1 and 6, the outermost section 38, i. e., the section of greatest diameter, is concentrically located with relation to the cylindrical body 9 of the enclosing casing and is spaced from the body so as to provide an annular space or passage which extends throughout the length of the filter chamber and is in open communication with the cooling chamber but only through clearance space between the baffle 29 and the body 9. Figures 1 and 6 also disclose the end ring 39', of the outermost filter section, seated upon the baffle 29 and having its edges so formed that they interfit with correspondingly formed surfaces on the baffle and thereby center the section with relation to the baffle and provide a seal for the filtering element, i. e., prevents the leakage of fluid between the ring 39 and baffle 29.

Each end ring 39 is provided with an outwardly turned lip or flange, whereas each end ring 40 is provided with a re-entrant or inwardly turned lip or flange. The re-entrant flange of the ring 40 of the outermost filter section 38 overlaps and is secured to the outwardly extending flange of the end ring 39 of the next adjacent filter section and these two sections are located in concentric spaced relationship. Each section 38 is provided at one end with a ring 39 and at the other with a ring 40. The flange of each ring 40 overlaps and is secured to the flange of the ring 39 located on an adjacent section 38 of smaller diameter, with the result that the filter sections 38 are connected together to form a unitary structure in which the sections are arranged in telescopic spaced relationship. Screws 42 are shown as the means for securing each ring 39 to an adjacent ring 40. It will also be noted that the alternate spaces between the sections 38 are open at opposite ends of the unitary structure.

The ring 40 of the innermost and smallest filter section is somewhat elongated and its inwardly turned lip bears snugly against the pipe 14 and also provides a support for a gasket 43 located between it and the head 11 and employed for the purpose of providing an air-tight joint between the gasket and head and thus preventing the passage of air to the outlet port before it has passed through one of the filtering sections.

In the illustrated embodiment, a band-like filtering element 41 is supported on each filter section. It may be composed of fabric or similar material and is generally wound around the net-like portion of the supporting section 38 and is secured thereto in such relation to the impervious end rings thereof that all air passing through the open or network portion of the section must necessarily pass through the filtering element carried by the section. It will be understood that the effectiveness of the filtering element may be varied by varying the number of laps of fabric or similar material wrapped around each filter section or by varying the character or thickness of the material of which the element is made. It will be apparent that after the band-like element has been wrapped around its supporting section it can be readily and easily secured in place thereon by a suitable wire or similar tie member which encircles it and also the supporting section.

As previously described, the combined or interfitting filter sections are secured together to provide a filtering unit which is located within the casing 8 and is held in position therein by the cooperation of the baffle 29, the pipe or tube 14 and the head 11.

In the apparatus illustrated, the tube 14 is divided in two parts by means of a plug 45 which is located within the pipe 14 and forms a seal between its opposite ends. The pipe is also provided with a series of apertures 46 which are formed in the portion of the pipe below the plug and which constitute air inlet ports to the cooling compartment or chamber of the combined apparatus. Similar apertures 47 are formed in the portion of the pipe 14 above the plug 45 and they constitute air-outlet passages for the filter compartment of the assemblage. It will, of course, be understood that all the apertures 46 are so located that each terminates within and consequently delivers air to the spiral passage formed by the spiral partition 32. Likewise, the apertures 47 are so positioned that each is located within the confines of the filtering compartment, i. e., between the baffle 29 and the head 11.

The cooled and dehydrated air leaving the spiral passage of the cooling compartment moves upwardly into the annular space between the outermost filter section 38 and the inner face of the body 9. In Figure 1, the reference character A is applied to this space and I note that it is in open communication with the space B located between the head 11 and the upper ends of the filter units. The space B is in open communication with concentric passages C located between certain of the filter sections 38. A space E, corresponding in dimensions to the space B, is located between the head 29 and the lower end of the filtering unit. This space is separated from the annular space A by the outermost section 38 and consequently by the filtering element 41 carried by that section. It is in open communication with concentric passages D located between the filter units and in alternate relationship with the passages C.

From this it will be apparent that air, entering the annular passage A, may pass through the outermost filter element and thus enter one of the passages D and pass from there through the space E to the innermost passage D which is in open communication with the outlet ports 47. Some of the air entering this annular space A may pass into the space B and from thence into one or another of the concentric passages C. Air contained in each such passage may move either inwardly or outwardly in passing to a passage D and may, therefore, move through either the inner or the outer filtering element between which the passage C is located. After air or fluid to be filtered has entered one of the passages D it need not, and will not, pass through another filtering element in its travel toward the outlet ports 47.

With the arrangement of filter sections and passages A, B, C, D and E illustrated, it will be apparent that air or fluid issuing from the cooling chamber has, in effect, a wide path of travel toward the outlet ports 47 and that it may pass through any one of the several filtering elements constituting a part of the filter unit. Under such conditons, the air flow through the filter compartment is relatively slow, with relation to the flow through other parts of the apparatus, and flow conditons may, therefore, be so apportioned as to accomplish the most effective filtering operations with the filtering means employed.

The lower head 10 may be provided with three or more brackets 49 so arranged as to function as supporting legs for the assembled apparatus. But one such bracket is shown. It is illustrated as secured to the head by means of tap bolts 50.

In assembling the apparatus, the pipe 14 is secured in place in the head 10 and a lock nut 51 may be employed for rigidly securing it to the head. The sleeve 36 may then be moved along the pipe 14 to position against the head 10. The float valve 22 and its operating float 23 can be assembled in place on the head 10 at any convenient time either before or after the pipe 14 is secured to the head. After this is done, the cooling unit is moved to place around the pipe 14 and against the sleeve 16 which—as previously described—forms a stop for and consequently positions the cooling unit with relation to the head 10 and the other portions of the assembled apparatus. In moving the cooling unit to place, the upper end of the pipe 14 is inserted through the central apertures of the baffles 28 and 29 and the cooling element is then slid along the shaft until the baffle 28 engages the sleeve 36. The pipe 14 and the sleeve, therefore, position the cooling unit within the casing 8. After the cooling unit is in place, the pipe 33 is coupled to the inlet and outlet pipes 21 and 34, both of which project through suitable apertures formed in the head 10.

The assembled filtering unit is next moved to place around the pipe 14 and is positioned and centered with relation to the baffle 29, as previously described. The gasket 43 is then placed around the pipe 14 and against the inturned lip of the end ring 40' of the innermost filtering unit. The cylindrical body 9 is then moved downwardly around and past the assembled filtering and cooling units and its lowermost edge is seated in the circular groove 12 of the head 10, a gasket having previously been placed in that groove. A similar gasket is placed in the circular groove 12 of the head 11 and that head is strung onto the pipe 14 and positioned so that the upper edge of the cylindrical body 9 enters the groove 12. The whole assembly is then locked together by means of lip washer 17, its gasket 16 and the nut 54.

In operation, a differential of pressure is established between the upper and lower ends of the pipe 14, i. e., on opposite sides of the plug 45 and between the inlet and outlet of the casing 8. This may be accomplished by delivering air (the fluid to be dehydrated and filtered) under pressure to the lower end of the pipe 14 (inlet port of the casing 8) and discharging it from the upper portion of the pipe 14 (outlet port of the casing 8) into a region or receptacle of lower pressure. This also may be accomplished by placing the upper end of the pipe in communication with a receptacle or region of sub-atmospheric pressure and in that way create a flow of fluid from the ports 46 into and through the cooling unit and then through the filtering unit to the ports 47 and the receptacle or region of reduced pressure.

Independently of how the fluid flow is created and maintained, air entering the ports 46 is caused to pass through the spiral passage defined by the partition 32. While traversing this passage, the air is subjected to the cooling action of the cooling medium flowing through the loops or convolutions of the fretwork or piping 33. As shown, the entire length of the partition 32 is subjected to the direct effect of the cooling medium traversing the pipe 33 with the result that both sides of the air stream passing through the spiral passage are subjected to the heat-absorbing effect of the cooling medium. In addition, the fretwork formed by the piping 33 tends to create a turbulence in the air stream passing through the spiral passage with the result that all portions of the stream are repeatedly subjected to the direct cooling action of a heat-absorbing wall.

The spiral movement of the air traversing the spiral passage renders centrifugal force effective in aiding the separation of the condensed and condensing vapors from the non-condensible fluid (air) or, in other words, the circular or spiral movement of the air as it moves through the cooling unit contributes to the collection of condensate upon heat-absorbing surfaces defining the spiral passage. The deposition of condensate on the cold surfaces of the spiral passage, of course, wets those surfaces and, therefore, occasions a washing action of the air as it passes through the passage. As has already been pointed out, the flow of cooling medium through the pipe 33 is opposite to that of the air flow with the result that the air encounters progressively colder surfaces as it moves from the inlet to the outlet end of the spiral passage, thus facilitating the removal of substantially all the moisture from the air.

The condensate collecting on these walls flows by gravity to the lower portion of the spiral passage and finally moves across the upper face of the baffle 28 and drops off that baffle and into the collecting chamber 23. In Figure 4, segments of the baffle 28 are shown cut away so as to provide four adequate water-discharge spaces 55 which permit a free flow of condensate off the baffle and into the collecting chamber. In addition, the fragmental sectional view of Figure 5 discloses a desirable feature of the baffle, viz., a beveling of its peripheral edge so as to contribute to the ready flow of water from the baffle and into the collecting chamber. The float-actuated valve 22 controls the condensate outlet of the chamber 26a and consequently operates so that the opening and the closing of the valve do not occasion appreciable variations in the fluid pressure within the casing 8.

As previously described, the individual filtering elements 41 of the several filter sections 38 cooperate to, in effect, form a single filter element of wide expanse which extends between the outlet end of the spiral cooling passage and the ports 47 of the pipe 14. Thus it is apparent that the air leaving the cooling unit moves from the relatively restricted spiral passage into the almost totally unobstructed upper portion of the casing 8 with the result that its rate of travel is materially decreased. The cooled air leaving the passage, therefore, moves at a leisurely rate through one or another of the filtering elements 41 and thus passes toward and through the outlet ports 47 where its velocity of travel is stepped up by the fact that it enters the narrow confines of the pipe 14.

While I have described but one embodiment of my invention, it will be apparent that various changes, modifications, additions and omissions may be made in the apparatus and that the procedure described may also be varied to some extent without departing from the spirit and scope of my invention as set forth by the appended claims.

Having thus described my invention, what I claim is:

1. In combination in a combined filter and dehydrator, an upright casing comprising a cylindrical shell and a separate head engaging and closing each end of said shell, a tubular member extending through and located concentrically of said shell and having two sets of ports formed therein between said heads, a partition in the tubular member isolating one such set of ports from the other, a cylindrical cooler located within said casing surrounding said member in open communication with one set of the ports formed therein and supported in spaced relation by the lower head, a filter located within said casing surrounding said member in open communication with the other set of ports formed in said member and supported by said cooler means for securing both said heads to said member and in place on said shell and float controlled means within said casing for controlling a liquid delivery port formed in said shell.

2. In a combined filter and dehydrator, an upright casing comprising a cylindrical shell and a separate head closing each end of said casing; a tubular member extending coaxially through said shell and through both said heads and having two groups of ports formed therein; a partition within said member isolating one such group of ports from the other; a sleeve surrounding the lower portion of said member and supported by the lower head; a cooling unit surrounding a portion of said member, supported by said sleeve and in open communication with one group of said ports; a filter unit aligned with and supported by said cooling unit and in open communication with the other group of ports; means within said casing below said cooling unit for controlling a liquid delivery port formed in the lower head and means for securing each of said heads to said shell.

3. In a combined filter and dehydrator, an upright casing comprising a cylindrical shell and a separate head closing the upper and lower ends thereof; a tubular member extending through said shell and said heads and having two sets of ports formed therein in spaced relationship along the length thereof and located between said heads; a plug within said member between the two groups of ports; a cooling unit located within said casing, around said member and in open communication with the lowermost group of ports; a spacer supported by the lower head and supporting said cooling unit; a filter located within said casing, and supported by said cooling unit, in open communication with the uppermost set of ports thereof and engaging the upper head; means for securing both said heads to said member and in place on said shell and for holding said spacer, said cooling unit and said filter unit in place within said casing; and means within said casing below said cooling unit for controlling a liquid discharge port formed in said casing.

LEWIS E. HANKISON.